United States Patent [19]
Kahlen

[11] Patent Number: 5,529,470
[45] Date of Patent: Jun. 25, 1996

[54] APPARATUS FOR FLATTENING A BLOWN FOIL TUBE OF THERMOPLASTIC SYNTHETIC RESIN

[75] Inventor: Wilhelm Kahlen, Troisdorf, Germany

[73] Assignee: Reifenhauser GmbH & Co. Maschinenfabrik, Troisdorf, Germany

[21] Appl. No.: 405,661

[22] Filed: Mar. 16, 1995

[30] Foreign Application Priority Data

Mar. 18, 1994 [DE] Germany .............................. 9404577 U

[51] Int. Cl.$^6$ ................................................ B29C 53/20
[52] U.S. Cl. ......................... 425/72.1; 425/325; 425/392
[58] Field of Search ................................. 425/72.1, 325, 425/327, 326.1, 387.1, 377, 392, 328; 264/565, 566, 209.3, 210.2

[56] References Cited

U.S. PATENT DOCUMENTS

| | | | |
|---|---|---|---|
| 2,844,846 | 7/1958 | Kronholm | 425/72.1 |
| 3,804,572 | 4/1974 | Upmeier | 425/326.1 |
| 4,643,656 | 2/1987 | Karl | 264/566 X |
| 4,676,728 | 6/1987 | Planeta | 425/387.1 |
| 4,836,744 | 6/1989 | Karl et al. | 425/327 X |
| 5,360,328 | 11/1994 | Cree et al. | 425/392 X |
| 5,437,544 | 8/1995 | Achelphl | 425/377 X |

FOREIGN PATENT DOCUMENTS

| | | |
|---|---|---|
| 0408996 | 1/1991 | European Pat. Off. . |
| 2639551 | 4/1982 | Germany . |

*Primary Examiner*—Richard L. Chiesa
*Attorney, Agent, or Firm*—Herbert Dubno

[57] ABSTRACT

In a foil blowing apparatus, the distribution of singularity in the flattened foil tube over the length of a roll in which the tube is coiled are distributed by a fold shifting device above the squeezing rollers at the top of the foil blowing unit. The fold shifting device has three sets of pivotal planes each formed by a deflecting roller and a turning bar and oriented so that the maximum angle between each approaching stretch of the flattened tube and a perpendicular to the turning bar is 30° and the maximum angle of each departing stretch and the perpendicular to the turning bar is 30°.

3 Claims, 4 Drawing Sheets

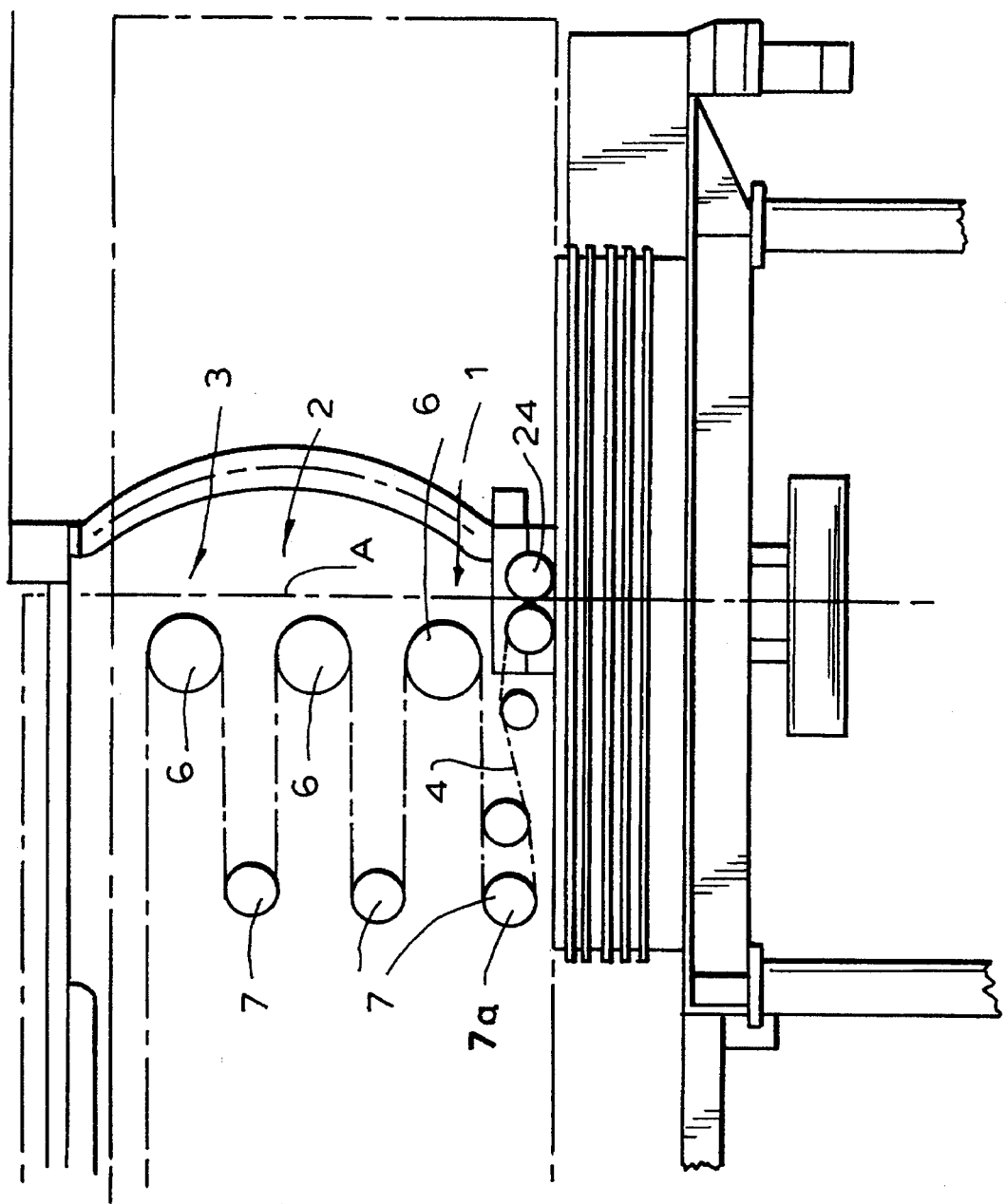

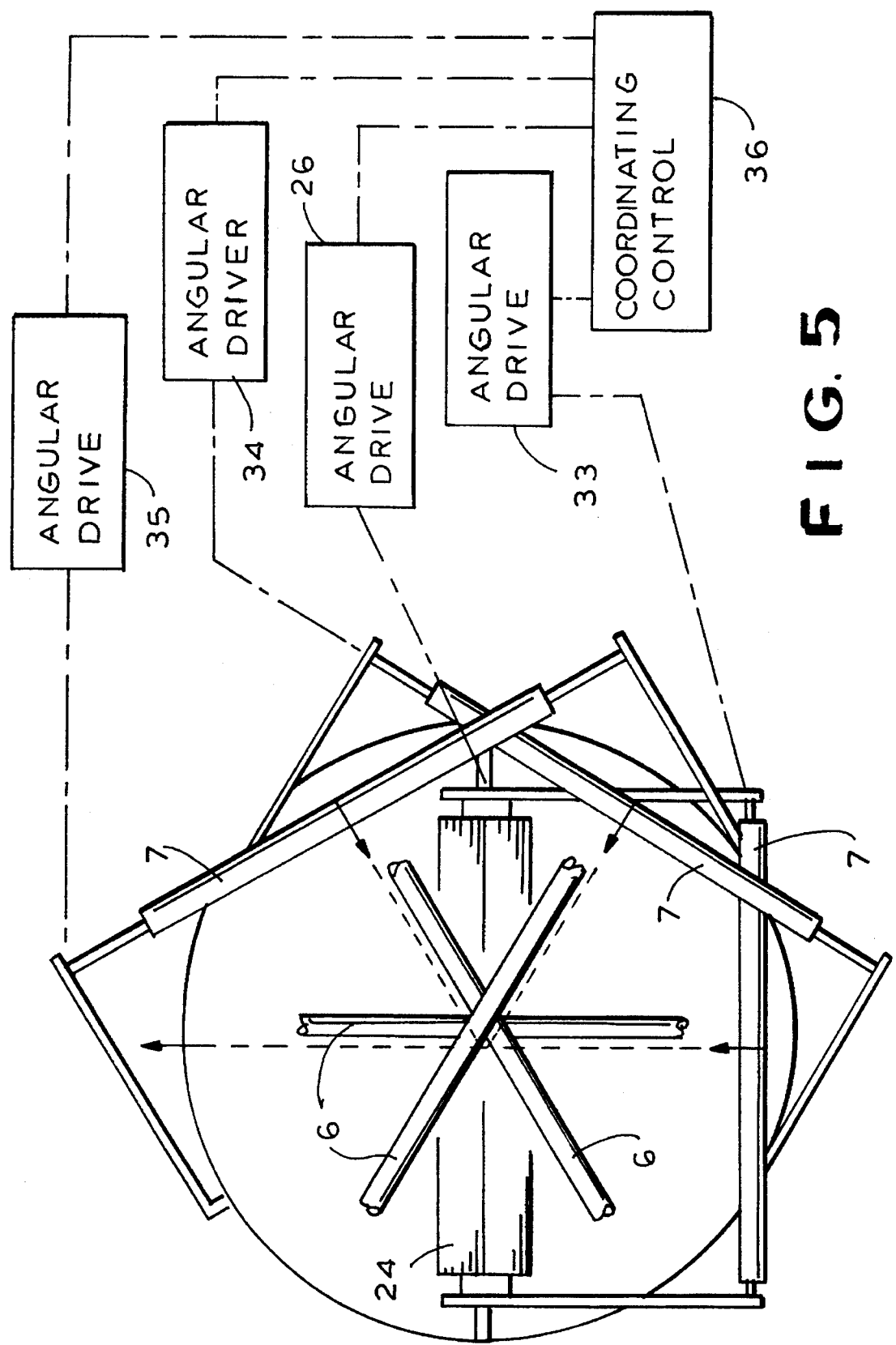

APPARATUS FOR FLATTENING A BLOWN FOIL TUBE OF THERMOPLASTIC SYNTHETIC RESIN

FIELD OF THE INVENTION

My present invention relates to an apparatus for the flattening of a blown foil tube of a thermoplastic synthetic resin and, more particularly, in a foil blowing installation in which the flattening tube of blown foil is ultimately wound into a roll or coil, to a flattening system which will cause the folds along the edges of the flattened tube to shift relative to the periphery of the blown tube and thereby allow the formation of substantially constant cross section rolls.

BACKGROUND OF THE INVENTION

In foil blowing processes, generally an extruded tube of a thermoplastic synthetic resin is blown into a tubular balloon (blown tube) which is flattened at an upper end into a flattened tube consisting of two webs of the synthetic resin foil, joined together at edge folds.

The apparatus can include a pair of squeezing rolls above the foil blowing part of the apparatus which closes off the top of the balloon and allows the air within the balloon to stretch the extruded synthetic resin tube to thin the latter, thereby producing the foil.

An apparatus of this type can include an extruder which is provided at the bottom of the tube with a foil blowing head. In an apparatus of the type with which the invention is concerned, the blowing head does not rotate, either continuously or in a reversible manner. The extruder unit is also stationary. The blown-foil tube has a circumference 2 πr where r is the diameter of the blown balloon as measured at an intermediate section of the height thereof between the blowing head and the squeezing rolls at the lower and upper ends of the blown foil tube (see German Patent Document 26 39 551 C2).

Upon the flattening of the blown foil tube, two foil webs are formed, each of width πr, joined along the edges of the flattened tube by edge folds.

To avoid the build up of barrel-shaped bulges or singular defects in the roll in which the flattened foil tube is wound, it is known to shift the folds along the periphery of the tube by fold-shifting means downstream of the blowing device. The fold shifting can be effected periodically with a corresponding reversing drive of the flattening device.

By angularly displacing the flattening unit, systematic defects are spread over the length of the roll or coil in which the flattened tube is wound to avoid the development of a barrel shape or bulges or the like in that coil. In the past, the flattening device generally had to be rotated through 360°. The complexity of such a drive and the complicated kinematics of the mechanism required to accomplish it were generally pronounced. A lesser displacement, however, with the earlier systems already described, could not fully distribute the defects over the length of the roll.

In EP 0 408 996 A2, the fold-shifting system is located along the central axis of the flattening/squeezing device and comprises two rods or bars disposed above one another and respective deflecting rollers cooperate with these bars. The flattened tube arrives at and leaves each deflecting roller in a direction perpendicular thereto and at least at a starting point the flattened tube arrives at a turning bar at an angle of 45° and leaves the turning bar at an angle of 45° so that the angle between arriving and departing stretches at each turning bar is 90°. During the swinging movement, this angle diminishes although the maximum angle is periodically restored.

With this construction as well the kinematics are complex and the control system required may not be fully reliable.

In fact, while the system generally operates well for small diameter blown foil tubes, with extremely large diameter blown foil tubes and very wide webs, the uniform passage of the flattened tube over the bar cannot be guaranteed. As a consequence, creases or the like may develop which defeat the entire purpose of the fold-shifting unit.

OBJECTS OF THE INVENTION

It is, therefore, the principal object of the present invention to provide an improved apparatus for flattening a blown-foil tube of a thermoplastic synthetic resin whereby drawbacks of the earlier systems can be obviated.

It is a more specific object of the invention to provide an apparatus for this purpose which is effective even with wide or very wide flattened tubes and which is especially characterized by the absence of creases and the like characterizing the handling of wide foils in earlier systems.

SUMMARY OF THE INVENTION

These objects and others which will become apparent hereinafter are attained, in accordance with the invention by providing a fold-shifting means in the flattening device and upstream of the receiving roller or receiving roller system, which comprises three turning bars and three deflecting rollers which result in three swinging planes or sets, each of which has a deflecting roller and a turning bar and which independently from one another can be angularly oscillated about the vertical axis and whereby the maximum angle included between the oncoming and departing stretches of the flattened foil tube at each bar is 60° (twice 30°).

I have found, most surprisingly, that with wide and very wide flattened foil tubes of the type described, the fold and crease formation which has hitherto been thought to be a corollary of the handling of such wide and very wide foil tubes simply does not occur when the maximum angle between the arriving and departing stretches of the foil at each turning bar is 60° rather than the 90° hitherto provided.

With three sets or shifting planes independently angularly oscillated, and a maximum angle of 60°, I can nevertheless achieve a full 360° distribution of the defects and a corresponding shift of the edges.

The provision of an extra set or plane with its deflecting roller or turning bar does not pose a kinematic problem and indeed the kinematics can be simplified because the angular oscillation can be less for each of the three planes or sets. I can, of course, use the kinematic systems described in the aforementioned EP 0 408 996 A2.

More particularly, the apparatus can comprise:

a flattening device having a vertical axis and formed with at least one pair of squeezing rollers pressing opposite sides of the tube together to flatten the tube into a flattened tube consisting of two webs joined at folds along opposite edges thereof;

means for angularly oscillating the pair of squeezing rollers about the axis;

fold-shifting means along the axis above the squeezing rollers for additionally shifting the folds relative to a periphery of the tube to prevent, on winding up of the webs into a coil, formation of barrel-shaped bulges, the fold-shifting means including:

three sets of deflectors disposed one above another along the axis, each of the sets including a deflection roller receiving the flattened tube which passes partly around the deflection roller, and a turning bar inclined relative to the deflection roller, the lowermost set receiving the flattened tube from the flattening device, the flattened tube passing from one set to another set in succession upwardly in the fold-shifting means, and means for angularly oscillating each of the sets about the axis independently of the others of the sets, an approach angle between the flattened tube and a perpendicular to an axis of each turning bar for the sets being at most 30° and a departing angle between the flattened tube and the perpendicular being at most 30°; and at least one fixedly positioned receiving roller receiving the flattened tube from the fold-shifting means and feeding the flattened tube to a winder.

BRIEF DESCRIPTION OF THE DRAWING

The above and other objects, features, and advantages will become more readily apparent from the following description, reference being made to the accompanying drawing in which:

FIG. 4 is an elevational view of the upper portion of a foil blowing apparatus, illustrating the fold-shifting means of the invention;

FIG. 5 is a plan view in highly diagrammatic form showing the sets of deflecting rollers and turning bars in angularly offset relationship.

DESCRIPTION OF THE PREFERRED EMBODIMENT

Figure 6:
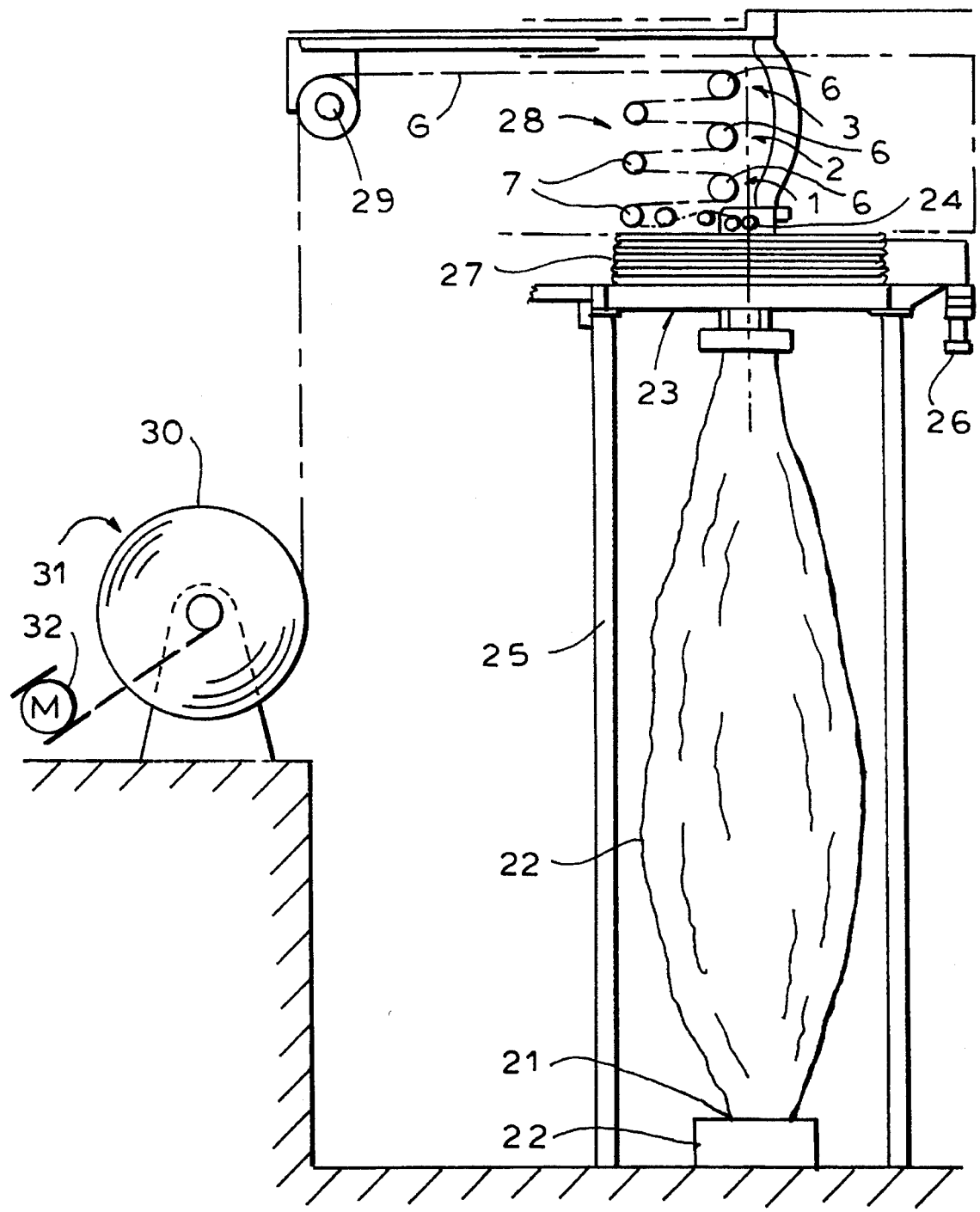
FIG. 6 is a diagrammatic elevational view of an apparatus according to the invention.

Referring to FIG. 6, it can be seen that a foil blowing apparatus can comprise a blowing head 20 which can be connected to an extruder and a surface of blowing air (see DE 26 39 551 C2), for example, so that an extruded tube 21 of thermoplastic synthetic resin is blown into a large diameter foil tube 22 which is provided at its upper end with a flattening device represented generally at 23 and having at least one pair of squeezing rollers 24 pressing opposite sides of the tube together to flatten the tube into a flattened tube consisting of two webs joined at folds along opposite sides thereof. The flattening device may be mounted on framework 25 of uprights and horizontal members and the drive for angularly oscillating the squeezing rollers 24 can include a motor 26 with belts 27 engaging the support for the squeezing rollers 24. The sets of deflecting rollers and turning bars may be angularly oscillated with similar means.

After traversing the fold-shifting means 28, which will be described in greater detail with respect to FIGS. 1–5, the flattened tube 4 passes over a roller 29 representing the roller or group of rollers which are fixed in place but whereby the foil tube 4 is fed to the roll or coil 30 on a coiling device 31 where the roll is driven by the motor 32. As can be seen from FIGS. 1–3, the fold-shifting means comprises three angularly oscillating planes or sets represented at 1, 2, 3 disposed in vertically spaced relationship above the pair of rollers 24 and independently angularly oscillatable about the axis A. In FIG. 4, solely for ease of illustration, all of the sets are shown to be located on the left hand side of the axis A. In FIG. 5 the actual orientations of the deflecting rollers and other turning bars can be seen.

Figure 1:
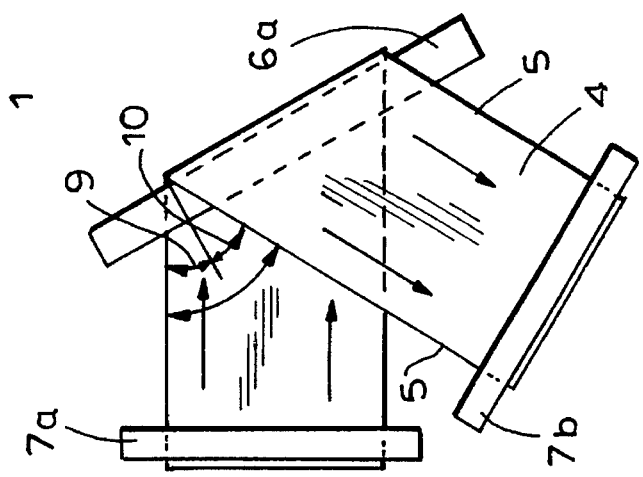

Set 1 can comprise a lower deflecting roller 7a receiving the flattened tube 4 from the squeezing rollers 24 and feeding that web to the first turning bar 6a (shown in FIG. 1).

From the first turning bar 6a, the web passes to the deflecting roller 7b forming a set with the second turning bar 6b (FIG. 2) and from the second set, the flattened tube passes around the third deflecting roller 7c before passing around the third turning bar 6c and ultimately running to the roller 8 which can be part of the roller system 29 previously described. The edge 5 are formed with the folds between the webs constituting the flattened tubes. The sets of deflecting rollers and turning bars can be actuated with a mechanism similar to that of EP 0 408 996 A2. In FIG. 5, representing the angular drives, I have shown an angular drive 33 for the lowest set, an angular drive 34 for the intermediate set and an angular drive 35 for the uppermost set, the angular drives independently oscillating the respective sets through at least 60° about the axis A. In this embodiment the angular drive for the squeezing rollers 24 has been represented at 26 and a common controller 36 is provided where desired for coordinating the angular displacement of the fold-shifting sets and the angular displacement of the squeezing rolls. The angular displacement of the fold-shifting means is thus independent from but coordinated with the angular displacement of the squeezing rollers about the vertical axis.

Figure 3:
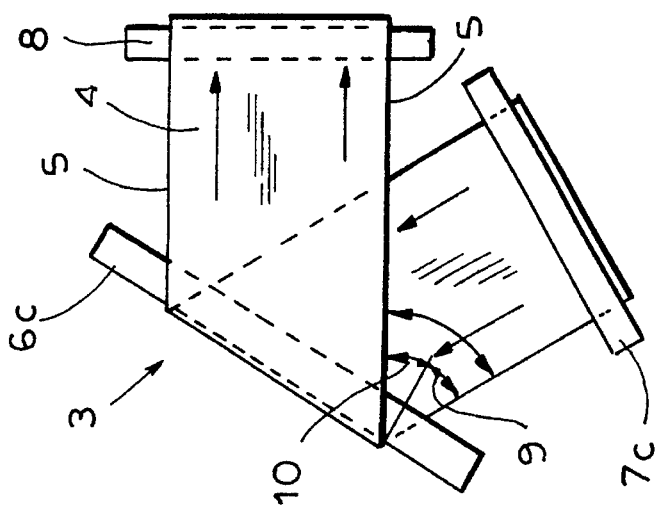
FIGS. 1, 2 and 3 show side by side the three sets in plan view constituting the respective pivot planes.
Figure 2:
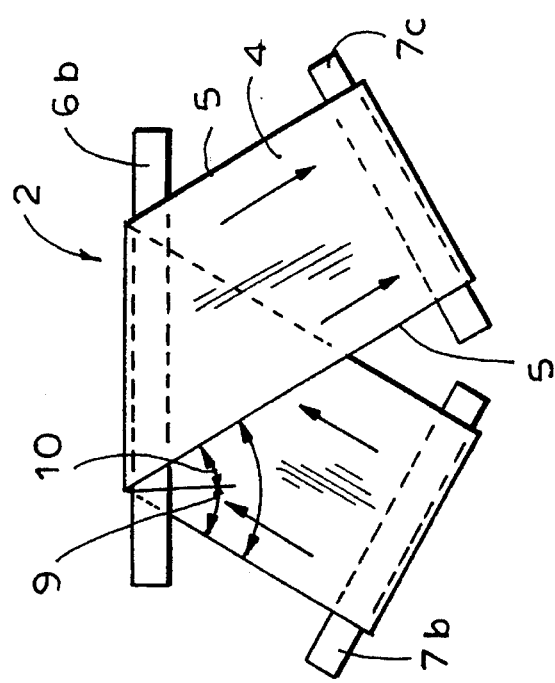

From FIGS. 1–3 it can be seen that the maximum angle 9 between the flattened tube arriving at a respective turning bar 6 and a perpendicular to that bar and the maximum angle 10 of a departing stretch of the flattened tube 4 and this perpendicular are each 30° so that the total deflection angle is a maximum of 60°.

I claim:

1. An apparatus for flattening a blown-foil tube of a thermoplastic synthetic resin, comprising:

a flattening device having a vertical axis and formed with at least one pair of squeezing rollers pressing opposite sides of said tube together to flatten said tube into a flattened tube consisting of two webs joined at folds along opposite edges thereof;

means for angularly oscillating said pair of squeezing rollers about said axis;

fold-shifting means along said axis above said squeezing rollers for additionally shifting said folds relative to a periphery of said tube to prevent, on winding up of said webs into a coil, formation of barrel-shaped bulges, said fold-shifting means including:

three sets of deflectors disposed one above another along said axis, each of said sets including a deflection roller receiving the flattened tube which passes partly around the deflection roller, and a turning bar inclined relative to the deflection roller, the lowermost set receiving said flattened tube from said flattening device, said flattened tube passing from one set to another set in succession upwardly in said fold-shifting means, and means for angularly oscillating each of said sets about said axis independently of the others of said sets, an approach angle between the flattened tube and a perpendicular to an axis of each turning bar for said sets being at most 30° and a departing angle between the flattened tube and said perpendicular being at most 30°; and at least one fixedly positioned receiving roller receiving said flattened tube from said fold-shifting means and feeding said flattened tube to a winder.

2. The apparatus defined in claim 1 further comprising means for winding the flattened tube into a coil downstream of said receiving roller.

3. The apparatus defined in claim 1 further comprising control means coordinating angular oscillation of said sets and said squeezing rollers.

\* \* \* \* \*